United States Patent
Kikkawa

(10) Patent No.: US 12,383,385 B2
(45) Date of Patent: Aug. 12, 2025

(54) INTERDENTAL CLEANING TOOL

(71) Applicant: Kobayashi Pharmaceutical Co., Ltd., Osaka (JP)

(72) Inventor: Tasuku Kikkawa, Osaka (JP)

(73) Assignee: Kobayashi Pharmaceutical Co., Ltd., Osaka (JP)

( * ) Notice: Subject to any disclaimer, the term of this patent is extended or adjusted under 35 U.S.C. 154(b) by 364 days.

(21) Appl. No.: 17/418,435

(22) PCT Filed: Nov. 18, 2019

(86) PCT No.: PCT/JP2019/045067
§ 371 (c)(1),
(2) Date: Jun. 25, 2021

(87) PCT Pub. No.: WO2020/137252
PCT Pub. Date: Jul. 2, 2020

(65) Prior Publication Data
US 2022/0087796 A1   Mar. 24, 2022

(30) Foreign Application Priority Data

Dec. 28, 2018   (JP) .................................. 2018-248342

(51) Int. Cl.
*A61C 15/00* (2006.01)
*A46B 1/00* (2006.01)
(Continued)

(52) U.S. Cl.
CPC ................ *A61C 15/00* (2013.01); *A46B 1/00* (2013.01); *A46B 9/021* (2013.01); *A46D 3/005* (2013.01); *A46B 2200/108* (2013.01)

(58) Field of Classification Search
CPC ..... A46B 2200/108; A46B 3/04; A46B 3/005; A46B 15/0069; A46D 3/00; A46D 3/005; A61C 15/00; A61C 15/02
See application file for complete search history.

(56) References Cited

U.S. PATENT DOCUMENTS

| | | | |
|---|---|---|---|
| 4,280,518 A * | 7/1981 | Gambaro | A46B 7/04 |
| | | | 132/329 |
| 5,775,346 A | 7/1998 | Szyszkowski | |

(Continued)

FOREIGN PATENT DOCUMENTS

| | | | | |
|---|---|---|---|---|
| DE | 202006019175 U1 * | 8/2007 | ............... | A46B 9/02 |
| DE | 102016005012 A1 * | 10/2017 | ......... | A46B 15/0069 |

(Continued)

OTHER PUBLICATIONS

Translation of JP 2017000775 A (Year: 2017).*

(Continued)

*Primary Examiner* — David S Posigian
*Assistant Examiner* — Steven Huang
(74) *Attorney, Agent, or Firm* — Wolf, Greenfield & Sacks, P.C.

(57) ABSTRACT

An interdental cleaning tool is provided, which is capable of suppressing from being broken. The interdental cleaning tool 1 includes: a base material portion 10 including a base section 11 and a shaft section 12 extending from the base section 11; a soft portion 20 including a covering section 21 that covers a distal end part 12a of the shaft section 12, and a plurality of projections 22 extending from the covering section 21; and an extension soft portion 30 covering a middle part 12b of the shaft section 12, the middle part being located further toward the proximal side than the soft portion 20 so as to extend the covering section 21 toward the proximal side of the shaft section 12, the extension soft portion 30 not being provided with the projections 22.

7 Claims, 7 Drawing Sheets

(51) Int. Cl.
  *A46B 9/02* (2006.01)
  *A46D 3/00* (2006.01)

(56) References Cited

U.S. PATENT DOCUMENTS

| | | | |
|---|---|---|---|
| 6,085,761 | A | 7/2000 | Inaba |
| 6,158,444 | A | 12/2000 | Weihrauch |
| 10,195,005 | B2 | 2/2019 | Wallström et al. |
| 11,026,771 | B2 | 6/2021 | Kikkawa |
| 11,484,110 | B2 | 11/2022 | Butz et al. |
| 12,083,723 | B2 | 9/2024 | Kikkawa |
| 2009/0193603 | A1 | 8/2009 | Ponzini |
| 2009/0230756 | A1 | 9/2009 | Crossman |
| 2010/0015567 | A1 | 1/2010 | Elbaz et al. |
| 2010/0024839 | A1 | 2/2010 | Kalbfeld et al. |
| 2010/0043165 | A1 | 2/2010 | Juentgen et al. |
| 2011/0226276 | A1 | 9/2011 | Limongi et al. |
| 2014/0008837 | A1* | 1/2014 | Eatherton ........... B29C 45/1671 264/243 |
| 2014/0123423 | A1 | 5/2014 | Morgott |
| 2015/0114428 | A1* | 4/2015 | Kato .................. A46B 15/0093 264/243 |
| 2015/0238294 | A1 | 8/2015 | Coopersmith |
| 2015/0257861 | A1 | 9/2015 | Dishon |
| 2015/0282601 | A1 | 10/2015 | Butz et al. |
| 2015/0335141 | A1 | 11/2015 | Schär et al. |
| 2016/0058531 | A1 | 3/2016 | Adriano et al. |
| 2017/0172289 | A1 | 6/2017 | Habibi-Naini et al. |
| 2017/0216002 | A1* | 8/2017 | Butz ...................... A46B 3/005 |
| 2017/0319309 | A1 | 11/2017 | Gengyo et al. |
| 2017/0319310 | A1 | 11/2017 | Gengyo et al. |
| 2018/0168783 | A1* | 6/2018 | Kato ...................... A46B 3/005 |
| 2019/0090623 | A1 | 3/2019 | Görich et al. |
| 2019/0183617 | A1 | 6/2019 | Pötsch et al. |
| 2019/0289984 | A1 | 9/2019 | Fischer |
| 2019/0343608 | A1 | 11/2019 | Kikkawa et al. |
| 2020/0188071 | A1 | 6/2020 | Kikkawa |
| 2020/0189159 | A1 | 6/2020 | Kikkawa |
| 2020/0260853 | A1 | 8/2020 | Zwimpfer |
| 2020/0405462 | A1 | 12/2020 | Petersen |
| 2022/0047365 | A1 | 2/2022 | Kikkawa et al. |
| 2022/0063155 | A1 | 3/2022 | Kikkawa |
| 2023/0414334 | A1 | 12/2023 | Kikkawa et al. |

FOREIGN PATENT DOCUMENTS

| | | | | |
|---|---|---|---|---|
| EP | 2882313 | B1 * | 11/2016 | ............ A46B 3/005 |
| JP | 2001-506514 | A | 5/2001 | |
| JP | D1421422 | S | 8/2011 | |
| JP | 2013-188299 | A | 9/2013 | |
| JP | 2013192866 | A * | 9/2013 | |
| JP | D1489187 | S | 12/2013 | |
| JP | D1492452 | S | 2/2014 | |
| JP | D1492453 | S | 2/2014 | |
| JP | D1492784 | S | 2/2014 | |
| JP | 2016-087362 | A | 5/2016 | |
| JP | 5929346 | B2 | 6/2016 | |
| JP | 2016104383 | A * | 6/2016 | |
| JP | 2016-131602 | A | 7/2016 | |
| JP | 2017-000762 | A | 1/2017 | |
| JP | 2017-000775 | A | 1/2017 | |
| JP | 2017-000776 | A | 1/2017 | |
| JP | 2017-118959 | A | 7/2017 | |
| JP | 2017-119095 | A | 7/2017 | |
| JP | 2017-136202 | A | 8/2017 | |
| JP | 6292246 | B2 | 3/2018 | |
| JP | 2018-140088 | A | 9/2018 | |
| JP | 2018-158004 | A | 10/2018 | |
| WO | WO 2013/176297 | A1 | 11/2013 | |
| WO | WO 2014/005659 | A1 | 1/2014 | |
| WO | WO 2014/054011 | A1 | 4/2014 | |
| WO | WO-2016020029 | A1 * | 2/2016 | ............... A46B 1/00 |
| WO | WO 2016/076373 | A1 | 5/2016 | |
| WO | WO 2016/167191 | A1 | 10/2016 | |
| WO | WO 2018/124302 | A1 | 7/2018 | |
| WO | WO-2022243505 | A1 * | 11/2022 | |

OTHER PUBLICATIONS

Translation of JP 2013192866 A (Year: 2013).*
Translation of DE 102016005012 A1 (Year: 2017).*
Translation of Tachuljukin (Year: 2007).*
Translation of JP 2016104383 A (Year: 2016).*
Translation of EP 2882313 B1 (Year: 2016).*
Kikkawa et al., Interdental cleaning tool. Co-pending U.S. Appl. No. 17/418,373, filed Jun. 25, 2021.
Kikkawa et al., Interdental cleaning tool. Co-pending U.S. Appl. No. 18/463,481, filed Sep. 8, 2023.
International Search Report and Written Opinion for International Application No. PCT/JP2019/045067, mailed Jan. 21, 2020.
Notice of Submission of Publications for Japanese Application No. 2018-248342, dated May 19, 2023.
Reason for Submission for Japanese Application No. 2018-248342, dated May 23, 2023.
[No Author Listed] 2011 Good Design Award, Silicone Rubber Interdental Brush. Japan Institute of Design Promotion. https://www.g-mark.org/en/gallery/winners/9d78119a-803d-11ed-862b-0242ac130002?years=2011. 2011:1-8.
[No Author Listed] Labeled drawings corresponding to JP D1421422 S: front view, bottom view, A-A cross-sectional view, C-C partially enlarged view, and reference perspective view. Aug. 22, 2011:1-4.
[No Author Listed] Dental Pro Silicone Rubber Interdental Brush (12 pieces). Yodobashi. https://www.yodobashi.com/product/100000001001664834/. Date first available Dec. 16, 2012:1-4.
[No Author Listed] Photographs showing dimensions of Dental Pro Silicone Rubber Interdental Brush (12 pieces). Photos undated; product first available Dec. 2012:1-2.
Kikkawa, Method for manufacturing interdental cleaning tool. Co-pending U.S. Appl. No. 17/418,437, filed Jun. 25, 2021.
Notice of Submission of Information for Japanese Application No. 2018-248342, Appeal No. Fufuku 2023-14939, filed Dec. 7, 2023.
Reason for Submission for Japanese Application No. 2018-248342, Appeal No. Fufuku 2023-14939, filed Dec. 7, 2023.
Notice of Submission of Information for Japanese Application No. 2018-248343, Appeal No. Fufuku 2023-19212, filed Dec. 7, 2023.
Reason for Submission for Japanese Application No. 2018-248343, Appeal No. Fufuku 2023-19212, filed Dec. 7, 2023.
[No Author Listed] Detailed drawings of JPD1489187S: the front view, the plan view and the A-A' end view of JPD1489187S, with the name of each component, etc. being added. JPD1489187S issued Dec. 27, 2013. 1-6.
[No Author Listed] Detailed drawings of JPD1492452S: the front view and the right side view of JPD1492452S, with the name of each component, etc. being added. JPD1492452S issued Feb. 14, 2014. 1-4.
[No Author Listed] Detailed drawings of JPD1492453S: the front view and the right side view of JPD1492453S, with the name of each component, etc. being added. JPD1492453S issued Feb. 14, 2014. 1-4.
[No Author Listed] Detailed drawings of JPD1492784S: the front view and the right side view of JPD1492784S, with the name of each component, etc. being added. JPD1492784S issued Feb. 14, 2014. 1-4.
U.S. Appl. No. 17/418,437, filed Jun. 25, 2021, Kikkawa.
Notice of Submission of Information for Japanese Application No. 2018-248342, dated Jan. 30, 2025.
Translation of Submission of Information for Japanese Application No. 2018-248342, dated Jan. 30, 2025.
[No Author Listed] Dental Pro Silicone Rubber Interdental Brush Usable for All Teeth from Front Teeth to Back Teeth. dentalpro.com. The Wayback Machine—https://web.archive.org/web/20130819212527/http://dentalpro.co.jp/product/interdentalbrush/silicon.html. [last accessed Jan. 30, 2025] 4 pages.

(56) References Cited

OTHER PUBLICATIONS

[No Author Listed] Transition Definition. Webster Dictionary, Merriam Webster. Dec. 25, 2024. https://www.merriam-webster.com/dictionary/transition. [last accessed Jan. 10, 2025] 6 pages.

* cited by examiner

INTERDENTAL CLEANING TOOL

CROSS-REFERENCE TO RELATED APPLICATIONS

This Application is a national stage application filed under 35 U.S.C. § 371 of International Patent Application Serial No. PCT/JP2019/045067, filed Nov. 18, 2019, which claims the benefit of Japanese Application No. 2018-248342, filed Dec. 28, 2018.

TECHNICAL FIELD

The present invention relates to an interdental cleaning tool.

BACKGROUND ART

Conventionally, interdental cleaning tools for cleaning the spaces between the teeth are known. For example, Patent Document 1 discloses an interdental cleaning tool that includes a base material portion made of a synthetic resin and a soft portion made of an elastomer. The base material portion includes a flat handle section, which serves as a handle, and an elongated core base material section, which extends from the handle section. The soft portion includes a covering section, which covers the distal end part of the core base material section, and a plurality of projections, which extend outward from the covering section.

CITATION LIST

Patent Document

Patent Document 1: WO 2013/176297

SUMMARY

Technical Problem

However, in the above-mentioned interdental cleaning tool, the position of the end of the region including the projections that is on the handle section side is substantially the same as the starting point of the soft portion (the boundary between the part of the base material portion where the soft portion is present and the part without the soft portion). For this reason, with the above-mentioned interdental cleaning tool, stress tends to be concentrated at the starting point of the soft portion, which is the end of the projections. Consequently, the interdental cleaning tool tends to break at the starting point of the soft portion when the projections are forcibly inserted deeply into a narrow space between teeth, for example. The broken soft portion can be undesirably stuck between the teeth, which is difficult to be taken out.

In view of the above, it is an objective of the present invention to provide an interdental cleaning tool capable of suppressing the interdental cleaning tool from being broken at the starting point of a soft portion.

Solution to Problem

An interdental cleaning tool according to one aspect of the present invention includes: a base material portion including a base section and a shaft section extending from the base section; a soft portion including a covering section that covers a distal end part of the shaft section, and a plurality of projections projecting from the covering section; and an extension soft portion covering a part of the shaft section, the part being located further toward a proximal side than the distal end part so as to extend the covering section toward the proximal side of the shaft section, and the extension soft portion not being provided with the projections. Here, the covering section refers to a section that extends from the distal end to the position of the projection that is the closest to the proximal end and in which the soft portion covers the shaft section. The covering section does not include the extension soft portion.

According to this aspect, the interdental cleaning tool includes the extension soft portion which covers a part of the shaft section, the part being located further toward a proximal side than the soft portion and not being provided with the projections. As such, the position of the end of the soft portion having the projections is spaced apart from the starting point of the extension soft portion on the proximal side (the boundary between the part where the extension soft portion of the base material portion is present and the part without the extension soft portion). Consequently, the stress applied to the interdental cleaning tool during use is dispersed and not concentrated at the starting point of the soft portion. This suppresses the interdental cleaning tool from being broken at the starting point of the soft portion. Furthermore, even if the shaft section breaks at the starting point of the soft portion, the broken part of the shaft section remains connected to the rest of the shaft section by the soft portion and the extension soft portion, thereby suppressing the likelihood that the broken part remains between the teeth.

In the above aspect, the extension soft portion may have a cylindrical shape covering the circumference of the shaft section.

In the above aspect, the extension soft portion may have an outer diameter same as that of the proximal end of the covering section of the soft portion.

In the above aspect, the extension soft portion preferably has a length of 3 mm or more in a direction along the shaft section.

In the above aspect, the extension soft portion may have an injection mark at which a soft material has been injected during injection molding.

Advantageous Effects of Invention

According to the present invention, an interdental cleaning tool can be provided that is capable of suppressing the interdental cleaning tool from being broken at the starting point of a soft portion.

DESCRIPTION OF EMBODIMENTS

Figure 1:
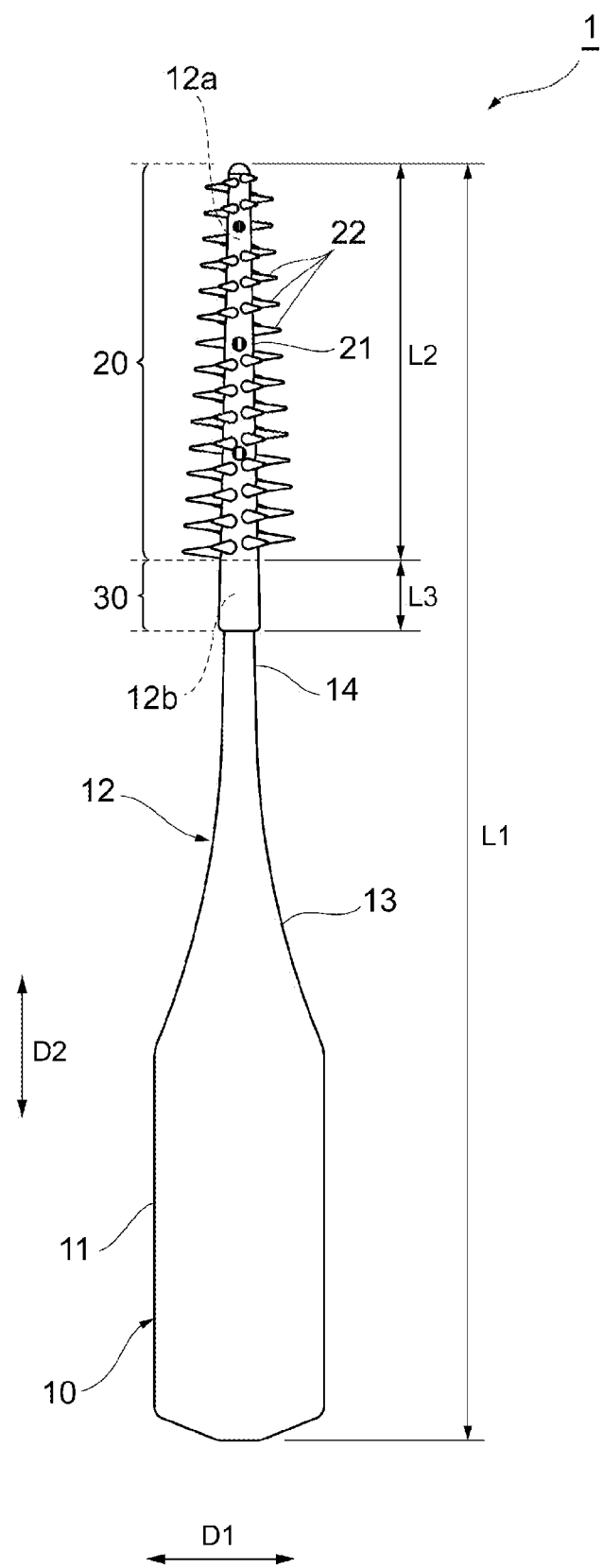
FIG. 1 is a front view schematically showing the configuration of an interdental cleaning tool according to an embodiment of the present invention.
Figure 2:
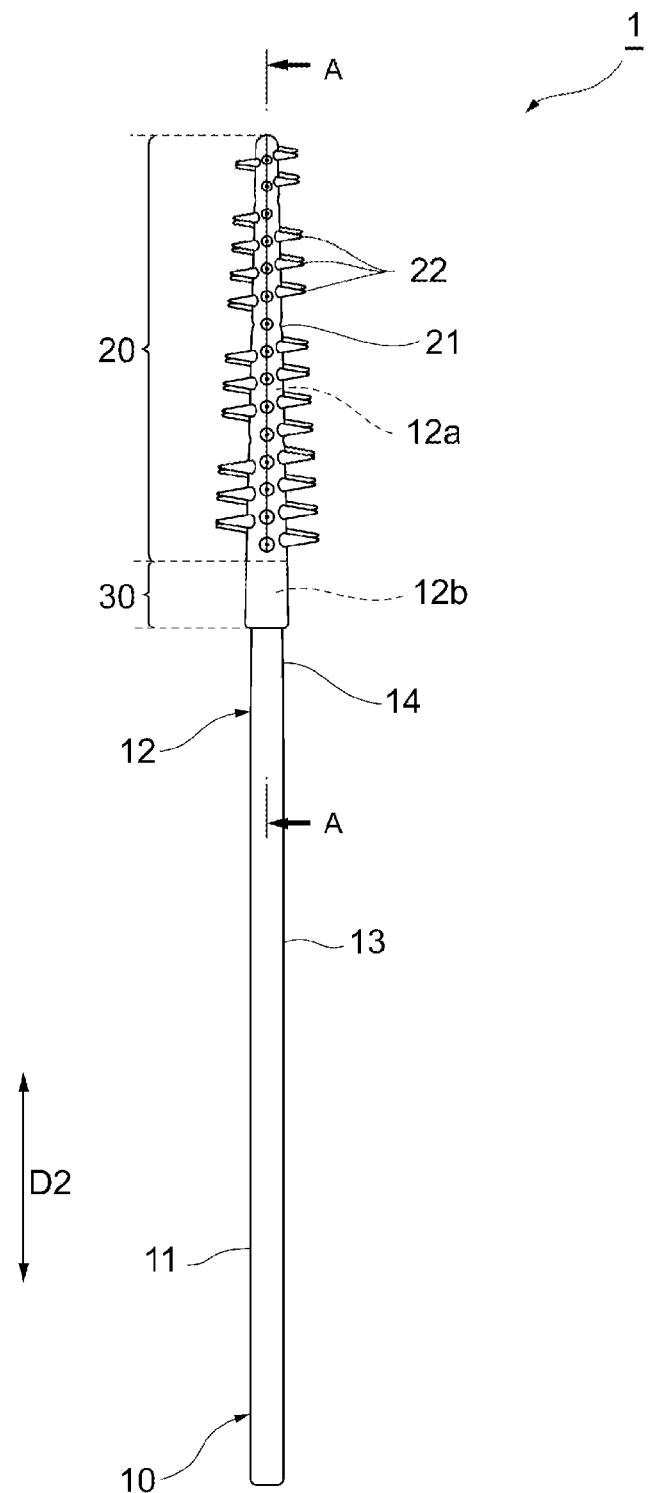
FIG. 2 is a side view schematically showing the configuration of the interdental cleaning tool according to the embodiment of the present invention.

Referring to the drawings, preferred embodiments of the present invention are now described. As shown in FIGS. 1 and 2, an interdental cleaning tool 1 according to an embodiment of the present invention includes a base material portion 10, a soft portion 20, which covers a part of the base material portion 10, and an extension soft portion 30.

The base material portion 10 has a base section 11, which serves as a holding section to be held by a user, and a shaft section 12, which extends from the base section 11 in a longitudinal direction (the up-down direction as viewed in FIG. 1) D2 extending perpendicular to a lateral direction D1 (the right-left direction as viewed in FIG. 1) of the interdental cleaning tool 1 and is to be inserted between teeth of the user. As used herein, the side corresponding to the shaft section 12 relative to the base section 11 (the upper side in the longitudinal direction D2 shown in FIG. 1) is referred to as a distal side, and the side corresponding to the base section 11 relative to the shaft section 12 (the lower side in the longitudinal direction D2 shown in FIG. 1) is referred to as a proximal side.

The base section 11 is formed, for example, in the shape of a flat rectangular plate. There is no limitation to the shape of the base section 11 as long as the user can hold it.

The shaft section 12 includes a transition section 13, which has the shape of a flat plate whose width in a front view decreases toward the distal end of the base material portion 10, and a distal end section 14, which may be cylindrical, for example, and extends linearly from the distal end of the transition section 13 to the distal end of the base material portion 10. For example, the distal end section 14 is shaped such that its diameter gradually decreases from the proximal end to the distal end.

The base material portion 10 is formed from, for example, a synthetic resin material as a base material. Examples of the synthetic resin material include polypropylene, polyethylene, acrylonitrile butadiene styrene (ABS), polybutylene terephthalate, polycarbonate, polyethylene terephthalate, polystyrene, polyacetal, polyamide, or the like. A fiber material such as glass fiber may be added to the synthetic resin material at a proportion of about 1 to 30% by weight.

Figure 3:
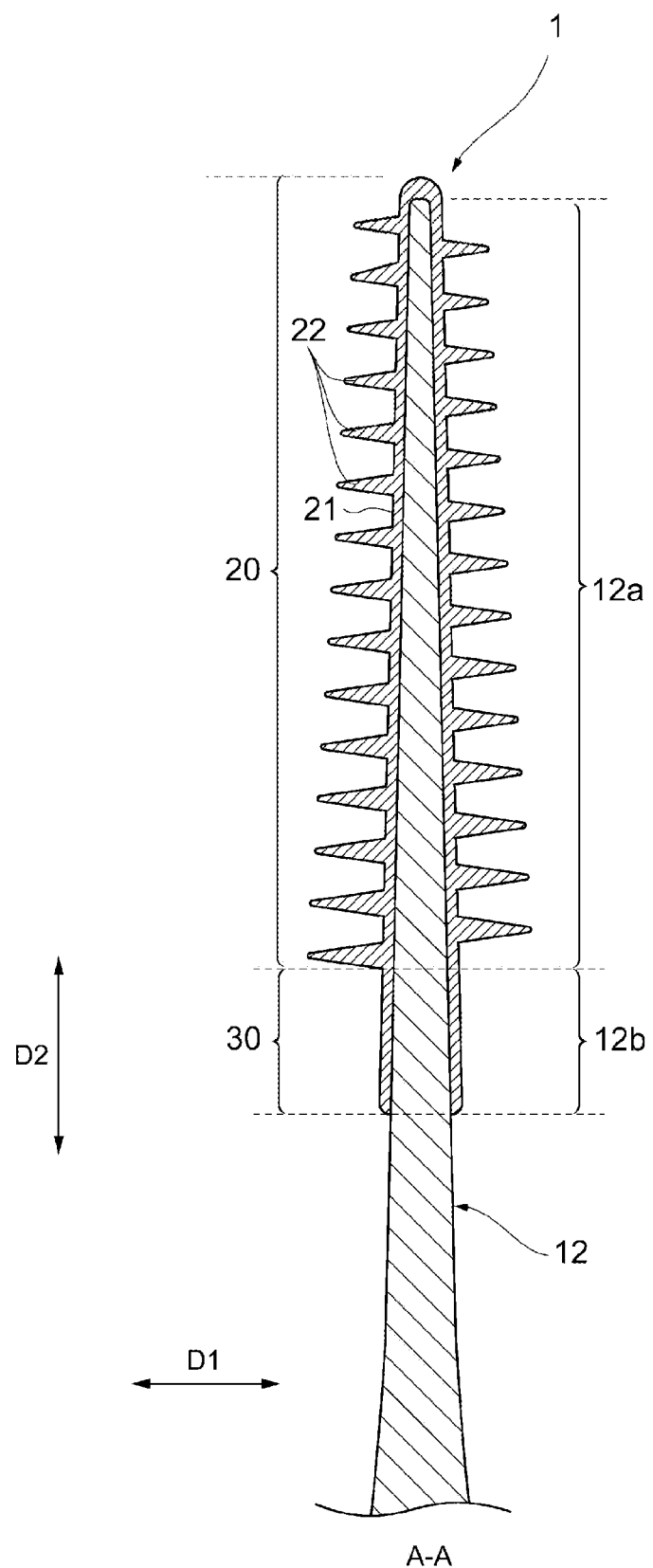
FIG. 3 is a cross-sectional view showing the distal side of the interdental cleaning tool taken along line A-A in FIG. 2.

The soft portion 20 is inserted between teeth of the user and functions as a cleaning portion. As shown in FIGS. 1 to 3, the soft portion 20 includes a covering section 21, which covers the outer circumferential surface of the distal end part 12a of the shaft section 12 from the proximal end to the distal end, and a plurality of projections 22 projecting outward from the covering section 21. The distal end part 12a of the shaft section 12 covered with the covering section 21 may be the same as the distal end section 14, or may be a part of the distal end section 14.

The length L2 of the soft portion 20 shown in FIG. 1 in the longitudinal direction D2 is set to, for example, 4 mm or more and 26 mm or less, preferably 9 mm or more and 21 mm or less, and more preferably 14 mm or more and 16 mm or less. The length L2 of the soft portion 20 may be 8% or more and 80% or less, preferably 15% or more and 65% or less, and more preferably 30% or more and 50% or less of the overall length L1 of the interdental cleaning tool 1 in the longitudinal direction D2, for example. The overall length L1 of the interdental cleaning tool 1 may be set to 45 mm or more and 55 mm or less, for example.

As shown in FIG. 3, the covering section 21 covers the surface of the distal end part 12a of the shaft section 12. The thickness of the covering section 21 is set to, for example, 0.05 mm to 2 mm. In the soft portion 20, the thickness of the covering section 21 gradually increases from the distal end toward the proximal end, and the extension soft portion 30 has a uniform thickness. Each projection 22 is formed in a conical shape, for example. The projections 22 are spirally arranged around the axis of the distal end part 12a of the shaft section 12 from the proximal end to the distal end of the covering section 21. The heights of the projections 22 from the outer circumferential surface of the covering section 21 gradually decrease from the proximal end to the distal end of the covering section 21. The height of each projection 22 may be set to 0.1 mm or more and 5 mm or less, for example.

The extension soft portion 30 shown in FIGS. 1 to 3 is adjacent to the soft portion 20 and closer to the proximal end of the shaft section 12 than the soft portion 20. The extension soft portion 30 covers a middle part 12b of the shaft section 12 on the proximal side of the distal end part 12a so as to extend the covering section 21 toward the proximal end of the shaft section 12. The extension soft portion 30 has a uniform thickness, is cylindrical, covers the outer circumferential surface of the middle part 12b of the shaft section 12, and does not have projections 22 such as those of the soft portion 20. The extension soft portion 30 has the same thickness as the proximal end of the covering section 21 of the soft portion 20, and is smoothly connected to the covering section 21.

The length L3 of the extension soft portion 30 shown in FIG. 1 in the longitudinal direction D2 is set to 3 mm or more, preferably 4 mm or more, more preferably 5 mm or more and 15 mm or less in a direction along the shaft section 12 (longitudinal direction D2). The length L3 of the extension soft portion 30 is set to, for example, 8% or more and 80% or less, preferably 15% or more and 65% or less, and more preferably 30% or more and 50% or less of the length L2 of the soft portion 20. The thickness of the extension soft portion 30 is set to 0.05 mm to 2 mm, for example.

Figure 4:
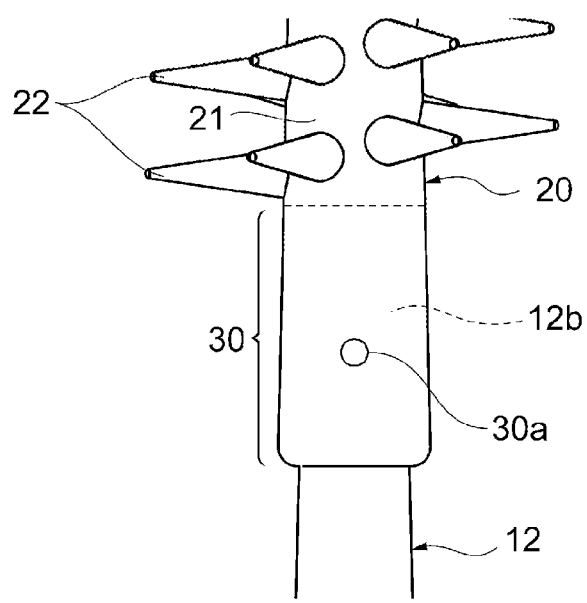
FIG. 4 is a partially enlarged view showing an injection mark of a soft material in an extension soft portion.

As shown in FIG. 4, the extension soft portion 30 has, in its surface, an injection mark 30a at which a soft material has been injected during injection molding. The injection mark 30a is located near the central part of the extension soft portion 30 in the longitudinal direction D2. There is no limitation to the position of the injection mark 30a as long as it is located in the extension soft portion 30.

The soft portion 20 and the extension soft portion 30 are formed of a resin material as a soft material having a lower hardness than the synthetic resin material of the base material portion 10. The resin material may be an elastomer, which may be a styrene-based elastomer, silicone, an olefin-based elastomer, a polyester-based elastomer, or the like. The hardness of the elastomer is preferably 10 to 50 with the durometer hardness type A (JISK6253), and more preferably 10 to 40. In this embodiment, the durometer hardness type A is 35.

Figure 5:
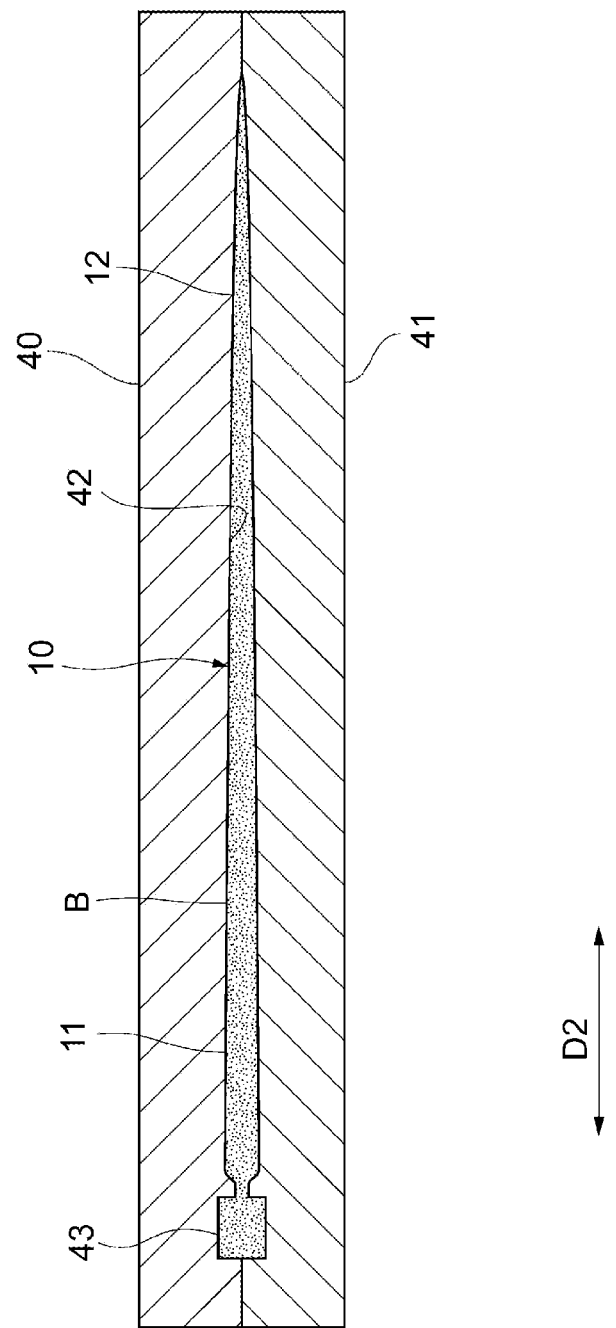
FIG. 5 is a cross-sectional view showing primary molds for forming a base material portion.

A method for manufacturing the interdental cleaning tool 1 is now described. First, as shown in FIG. 5, primary molds 40 and 41 are prepared to form the base material portion 10. A filling space 42 corresponding to the outer shape of the base material portion 10 is formed in the primary molds 40 and 41. A molten synthetic resin material B as a base material is introduced into the filling space 42 through a gate 43, and the base material portion 10 is formed (the first step). The base material portion 10 is then taken out from the primary molds 40 and 41.

Figure 6:
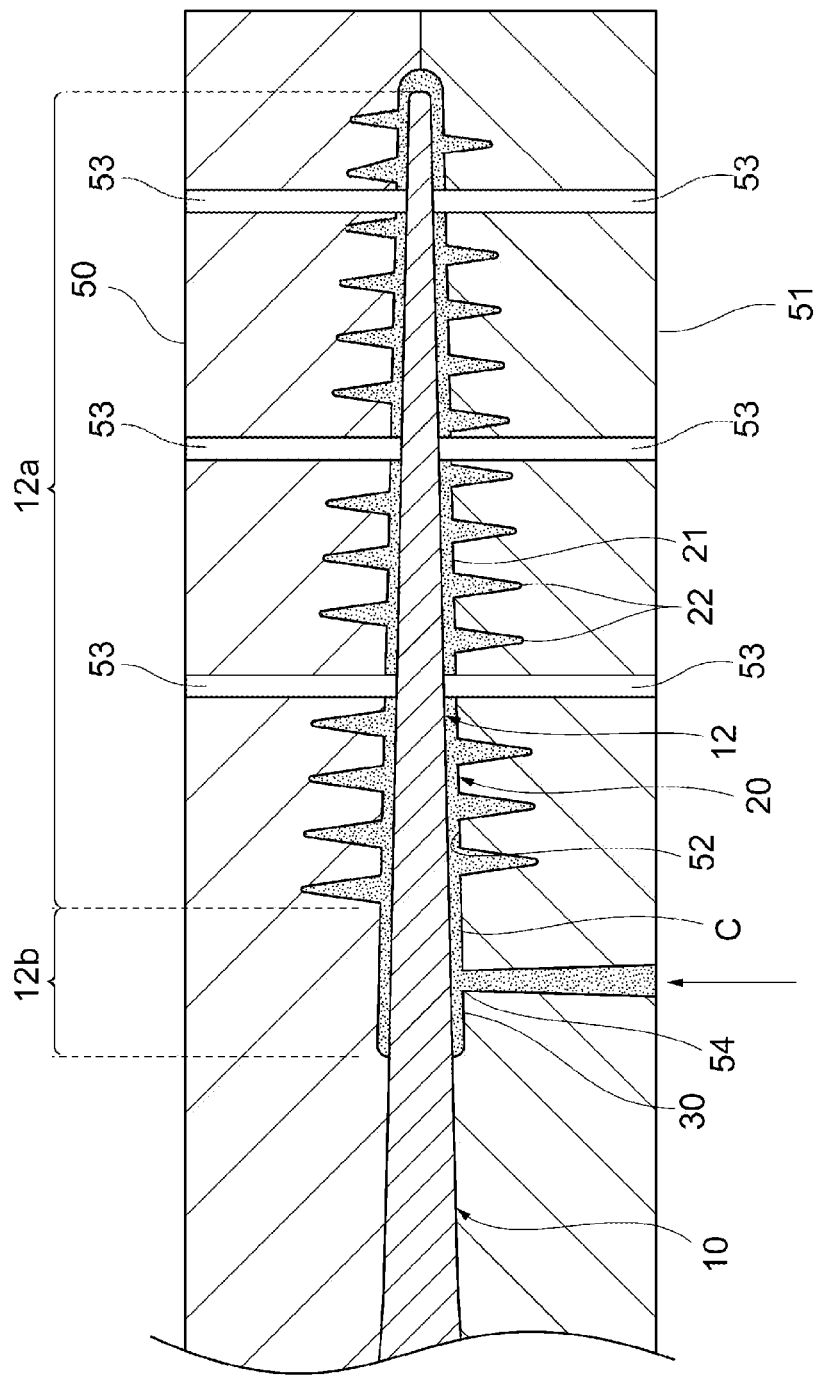
FIG. 6 is a cross-sectional view showing secondary molds for forming a soft portion.

Subsequently, as shown in FIG. 6, secondary molds 50 and 51 are prepared to form the soft portion 20. A filling space 52 corresponding to the outer shape of the soft portion 20 and the extension soft portion 30 is formed in the secondary molds 50 and 51. The secondary molds 50 and 51 include respective holding pins 53 of a plurality of pairs, which are movable into and out of the filling space 52 in directions perpendicular to the axis of the base material portion 10. Furthermore, the secondary molds 50 and 51 include a gate 54, which is formed in a position corresponding to the middle part 12b of the shaft section 12 of the base material portion 10, which is closer to the proximal end than the distal end part 12a.

The base material portion 10 formed in the first step is placed in the filling space 52 of the secondary molds 50 and 51. The holding pins 53 sandwich and hold the base material portion 10 from the front side and the back side. Then, the filling space 52 of the secondary molds 50 and 51 is filled with a molten elastomer C as a soft material through the gate 54, and the soft portion 20 and the extension soft portion 30 are formed (the second step). The interdental cleaning tool 1 is thus formed. The interdental cleaning tool 1 is then taken out from the secondary molds 50 and 51.

Figure 7:
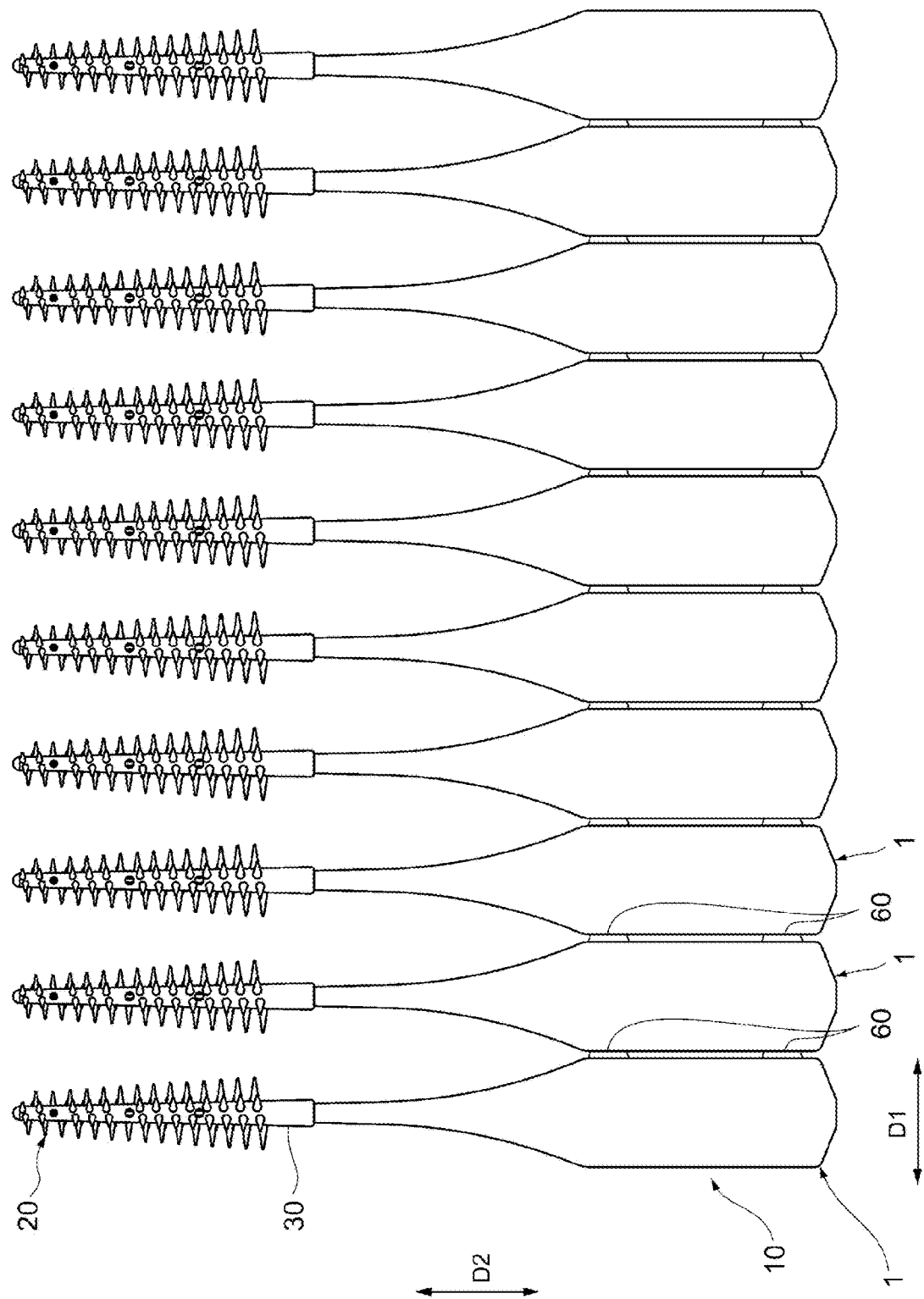
FIG. 7 is a front view showing a connected member including a plurality of interdental cleaning tools.

In the present embodiment, the configuration and manufacturing method of the interdental cleaning tool are described focusing on the single interdental cleaning tool 1, but the interdental cleaning tool 1 is one of a plurality of interdental cleaning tools that are formed as a connected member in which the interdental cleaning tools 1 are connected side by side in the lateral direction D1 by connecting sections 60 formed in the base material portions 10 as shown in FIG. 7, for example. The interdental cleaning tool 1 has been separated from the connected member as a single piece.

According to the present embodiment, the interdental cleaning tool 1 includes the extension soft portion 30, which covers the middle part 12b of the shaft section 12 on the proximal side of the soft portion 20 and is free of the projections 22. As such, the position of the end of the soft portion 20 including the projections 22 is spaced apart from the starting point of the extension soft portion 30 on the proximal side (the boundary between the part of the base material portion 10 where the extension soft portion 30 is present and the part without the extension soft portion 30). Consequently, the stress applied to the interdental cleaning tool 1 during use is dispersed and not concentrated at the starting point of the soft portion 20. This suppresses the interdental cleaning tool 1 from being broken. Furthermore, even if the shaft section 12 breaks at the starting point of the soft portion 20, the broken part of the shaft section 12 remains connected to the rest of the shaft section 12 by the soft portion 20 and the extension soft portion 30, reducing the likelihood that the broken part remains between the teeth.

Since the extension soft portion 30 has a cylindrical shape covering the circumference of the shaft section 12, the stress applied to the interdental cleaning tool 1 during use is likely to be dispersed throughout the extension soft portion 30 regardless of its orientation in use. This further suppresses the interdental cleaning tool 1 from being broken.

The extension soft portion 30 may have the same outer diameter as the proximal end of the covering section 21 of the soft portion 20 by adjusting the thickness of the elastomer C or the thickness of the shaft section 12. In this case, when the user inserts the extension soft portion 30 between teeth with the soft portion 20 with the cleaning function having passed the teeth, the lack of an increase in resistance helps the user to notice that the soft portion 20, which serves as the cleaning portion, has passed. Thus, the user can easily recognize the end point of the soft portion 20 with the cleaning function, so that the soft portion 20 can be efficiently used to clean between the teeth.

The extension soft portion 30 has a length of 3 mm or more in a direction along the shaft section 12. The extension soft portion 30 is therefore sufficiently long, so that the interdental cleaning tool 1 is less likely to break, and the shaft section 12 (the soft portion 20) is less likely to remain between the teeth even if it breaks.

The extension soft portion 30 has the injection mark 30a at which the elastomer C has been injected during injection molding. That is, to form the soft portion 20, the elastomer C is injected into the secondary molds 50 and 51 in which the base material portion 10 is placed through the gate 54 located at a position corresponding to the middle part 12b, which is on the proximal side of the distal end part 12a of the shaft section 12. As such, the injected high-pressure elastomer C is not directly applied to the distal end of the shaft section 12, sufficiently suppressing the distal end of the shaft section 12 from being swayed. Additionally, the high-temperature elastomer C is not directly applied to the distal end of the shaft section 12, sufficiently suppressing the distal end of the shaft section 12 from being molt. Moreover, since the elastomer C is injected onto the middle part 12b located on the proximal side of the distal end part 12a of the shaft section 12 in which the projections 22 are formed, the elastomer C is not directly injected into the region where the projections 22 are formed. As a result, the projections 22 can be suitably formed without being affected by the injection of the elastomer C. This suppresses the molding defect of the interdental cleaning tool 1.

The embodiments described above are intended to facilitate the understanding of the invention and are not intended to limit the interpretation of the present invention. The element of the embodiments, as well as their arrangements, materials, conditions, shapes, sizes, and the like are not limited to those illustrated and may be modified as appropriate. Additionally, the configurations shown in different embodiments can be partially replaced or combined.

For example, the shape of the interdental cleaning tool 1 is not limited to that of the above embodiments. For example, the shaft section 12 is formed linearly in the embodiments, but may be curved in an arc shape.

INDUSTRIAL APPLICABILITY

The present invention can provide an interdental cleaning tool capable of suppressing the interdental cleaning tool from being broken at the starting point of a soft portion.

REFERENCE SIGNS LIST

1 Interdental cleaning tool
10 Base material portion
11 Base section
12 Shaft section
12a Distal end part of shaft section
12b Middle part of shaft section
20 Soft portion
21 Covering section
22 Projection
30 Extension soft portion
40, 41 Primary mold
50, 51 Secondary mold
54 Gate

What is claimed is:

1. An interdental cleaning tool comprising:
a base material portion including a base section and a shaft section extending from the base section;
a soft portion including a covering section that covers a distal end part of the shaft section, the covering section having a plurality of projections projecting therefrom; and
an extension soft portion extending from the covering section, and covering a part of the shaft section, the part of the shaft section being located further toward a proximal side than the distal end part so as to extend the soft portion toward the proximal side of the shaft section, with the extension soft portion terminating in the shaft section before the base section such that the shaft section is exposed between the extension soft portion and the base portion; the extension soft portion being between 8% and 80% the length of the covering section, and the extension soft portion not being provided with the projections,
wherein a thickness of the covering section of the soft portion increases from a distal end of the covering section towards a proximal end of the covering section, wherein the extension soft portion has a uniform thickness, and wherein the extension soft portion has the same thickness as the proximal end of the covering section.

2. The interdental cleaning tool according to claim 1, wherein the extension soft portion has a cylindrical shape covering a circumference of the shaft section.

3. The interdental cleaning tool according to claim 1, wherein the extension soft portion has an outer diameter same as that of a proximal end of the covering section of the soft portion.

4. The interdental cleaning tool according to claim 1, wherein the extension soft portion has a length of 3 mm or more in a direction along the shaft section.

5. The interdental cleaning tool according to claim 4, wherein stress applied to the interdental cleaning tool during use is dispersed along a length of the extension soft portion and not concentrated at a starting point of the extension soft portion.

6. The interdental cleaning tool according to claim 4, wherein the extension soft portion is configured to retain a broken part of the shaft section, if a part of the shaft section breaks during use, thereby reducing a likelihood that the broken part remains between a user's teeth.

7. The interdental cleaning tool according claim 1, wherein the extension soft portion has an injection mark at which a soft material has been injected during injection molding.

* * * * *